US007252489B2

(12) United States Patent
Rivola

(10) Patent No.: US 7,252,489 B2
(45) Date of Patent: Aug. 7, 2007

(54) METHOD AND PLANT FOR FORMING LARGE-DIMENSION CERAMIC SLABS AND TILES

(75) Inventor: Pietro Rivola, Imola (IT)

(73) Assignee: SACMI-Cooperativa Meccanici Imola-Soc. A.R.L., Imola (Bologna) (IT)

( * ) Notice: Subject to any disclaimer, the term of this patent is extended or adjusted under 35 U.S.C. 154(b) by 540 days.

(21) Appl. No.: 10/686,279

(22) Filed: Oct. 16, 2003

(65) Prior Publication Data

US 2004/0081719 A1 Apr. 29, 2004

Related U.S. Application Data

(62) Division of application No. 10/029,029, filed on Dec. 28, 2001, now Pat. No. 6,685,860.

(30) Foreign Application Priority Data

Jun. 12, 2001 (IT) .......................... RE2001A0067

(51) Int. Cl.
*B29C 43/14* (2006.01)

(52) U.S. Cl. ..................... 425/80.1; 425/371; 425/355; 425/364 R

(58) Field of Classification Search ............... 425/80.1, 425/371, 352–355, 363, 365, 364 R
See application file for complete search history.

(56) References Cited

U.S. PATENT DOCUMENTS

| | | | | |
|---|---|---|---|---|
| 3,671,618 | A | 6/1972 | Huber et al. | |
| 4,158,533 | A * | 6/1979 | Longinotti | 425/139 |
| 5,776,511 | A * | 7/1998 | Miki et al. | 425/371 |
| 6,027,675 | A | 2/2000 | Cassani | |
| 6,800,229 | B2 * | 10/2004 | Acerbi et al. | 264/113 |

FOREIGN PATENT DOCUMENTS

| | | |
|---|---|---|
| IT | RE97A000057 | 8/1997 |
| IT | RE97A000058 | 8/1997 |
| IT | RE99A000061 | 5/1999 |
| WO | WO 96 15888 | 5/1996 |
| WO | WO 98 23424 | 6/1998 |

* cited by examiner

*Primary Examiner*—Tim Heitbrink
*Assistant Examiner*—Thu Khanh T. Nguyen
(74) *Attorney, Agent, or Firm*—Browdy and Neimark, PLLC

(57) ABSTRACT

The apparatus for forming large dimension ceramic tiles includes at least one first pressing unit (2) connected to at least one second pressing unit (4) by a conveying system (3) with which there may be associated at least one decorating unit for surface-finishing the blank formed by the at least one first forming unit, the at least one second pressing unit including two mutually movable superposed dies (7, 6), the lower of which is fixed and is positioned at the level of the conveying system, and the upper of which is movable in level between a raised position in which it awaits the arrival of the blank, and a lowered position in which it compacts the blank.

5 Claims, 4 Drawing Sheets

METHOD AND PLANT FOR FORMING LARGE-DIMENSION CERAMIC SLABS AND TILES

This is a division of parent application Ser. No. 10/029,029, filed Dec. 28, 2001 now U.S. Pat. No. 6,685,860.

This invention relates in a totally general manner to the manufacture of ceramic tiles.

More specifically it relates to the forming of large-format tiles, hereinafter called slabs, having sides well exceeding one metre, for example 1.5×2 m.

As is well known, modern ceramic technology has developed to the point of constructing hydraulic presses of very high power, such as to enable said large-dimension ceramic slabs to be obtained starting from at least one powder material which is substantially dry, i.e. having a moisture content between 1 and 11%.

A typical use for such slabs, either whole or cut into pieces to provide a sort of mosaic, possibly in combination with particular surface treatment or decoration, is in facing large interior and exterior surfaces, for example the interior walls of a stadium or the exterior walls of a large building.

Said large-dimension slabs are prepared by moulds of traditional type, i.e. consisting of a unit comprising a lower plate positioned on the bed of the press, and provided upperly with a die, usually a reverse face die; an intermediate plate provided with a forming cavity within which said reverse face die is slidingly received, said intermediate plate being fixed or movable; and an upper plate carried by the vertically movable crosspiece of the press and provided lowerly with a die, usually an exposed face die, which cooperates with the reverse face die to form the slab.

It should be noted that between the constituent elements of the mould there are provided openings or clearances through which the air present in the powders to be pressed is discharged, these openings or clearances having relatively very small dimensions, much smaller than the powder particle size. The reason for stating this will become apparent hereinafter.

Said forming cavity is loaded with a soft mass of at least one ceramic material in powder form which by the nature of things also contains air, this air having a volume which is substantially of the same order of magnitude as that of the powder alone, or in other words substantially one half that of the overall soft mass.

The problem therefore arises of evacuating said air during pressing, to prevent the slab undergoing damage during firing, such as surface separation, deterioration, cracking or even breakage, due to the air mass trapped within the slab interior.

This problem is important seeing that the larger the slab format, the greater the quantity of air to be evacuated, of the order to 60 litres in the case of a 1.5×2 m slab of 2 cm thickness, and the longer the path which this air has to take to reach the periphery of the mould cavity.

To extract the air from the initial powder material it is usual to maintain the mould in its closed configuration, i.e. with the dies clamped against the powder layer with the force necessary for the process underway, for the time required for the pressurized air to migrate from the interstices between the powder particles to the periphery of the mould cavity, where it escapes to the outside at high speed through said small openings or clearances in the mould.

However the time required to evacuate the air, usually known as deaeration, is in sharp contrast to modern operating cycles, which are characterised by massive production rates.

Said deaeration problem is a common problem in the forming of the various types of slabs, which are all included within the following three basic types: support or biscuit slabs, i.e. consisting of at least one not particularly valuable powder material, which are intended to be glazed separately before or after firing; fine porcellainized stone slabs, which do not need to be glazed as the desired aesthetic effect is provided by the actual powder material used to form at least the upper part of the slab body; and so-called pressure-glazed slabs which after pressing present a lower layer of relatively inexpensive material such as atomized clay, and an upper layer of material having the desired aesthetic characteristics, typically powdered ceramic glaze.

To produce these pressure-glazed slabs plants are known comprising essentially two moulds of traditional type connected together by a conveying system with which a decorating station, typically of dry type, is associated.

Base material is loaded into the first mould to form the body of the slab, after which this is pressed to obtain virtually total deaeration.

Having done this the blank obtained is then removed from the first mould, transferred to the at least one decorating station, then fed to the second mould where deaeration and compaction of the base material is completed, the glaze is deaerated and compacted, and the two are bonded together.

The operating pressure of the first stage is less than that of the second, for example a typical specific pressure of the first mould is 50-150 bar, whereas a typical specific pressure of the second mould is 250-600 bar.

In such pressure-glazing plants, in addition to this inconvenient slow down in production due to the deaeration, problems can arise while loading the blank or precompacted slab into the die plate of the second mould.

In this respect, and if operating under optimal conditions, in particular with a base material having a moisture content substantially equal to that typical or specific for the process under way, during said loading the blank must be virtually exactly aligned with the forming cavity of the second mould, and have virtually the same plan dimensions.

If this is not so, when the lower die descends, the blank remains temporarily engaged with at least one upper edge of the forming cavity, to then fall onto the completely lowered lower die, either because of vibration or following the descent of the upper die, this normally resulting in breakage of the blank and hence its discard because the next (second) pressing is unable to restore the integrity of the blank, and especially the integrity of the decoration.

If during the course of the day the moisture content of the starting material varies, as often happens, the problems are aggravated.

In this respect, if the moisture content increases, the expansion of the blank unloaded from the first mould decreases, and vice versa if the moisture content decreases.

Dealing with large-format blanks, a variation of even just 1% in the moisture content of the starting material leads to a dimensional variation in the blank sides of about 1 mm per linear metre.

Consequently, with said upward or downward dimensional variations, the loading means provided with the plant, which are obviously sized at the standard dimensions for the work in progress, and which are difficult to adjust in view of the relationship between the magnitude of such variations and the dimensions of such slabs, are unable to align the blank and the forming cavity of the second mould with the necessary accuracy.

In particular, if the dimensional variation is an increase, and is not particularly large, there is an increased probability that because of the said misalignment the blank remains engaged with at least one upper edge of the forming cavity during the descent of the lower die.

If instead the upward variation is fairly large, even assuming perfect alignment between the blank and the forming cavity the blank is unable to follow the lower die during its lowering, but remains resting on the perimetral edge of the cavity, with consequent breakage when the upper die descends.

Moreover if the dimensional variation is a decrease, whether small or large, as already stated misalignment can occur between the blank and forming cavity, with consequent unwelcome engagement between the blank and the upper edges of the cavity during the lowering of the lower die.

Consequently in this sector there is a great need for means able to overcome the aforestated complex problem.

The main object of the present invention is precisely to satisfy this requirement within the context of a constructionally simple, rational, reliable, durable, low-cost solution with a production capacity in line with modern production cycles and practically without rejects.

This object is attained by a method and plant having the characteristics indicated in the claims.

The invention is based on a working method comprising two separate stages of compression, and which, by virtue of the teachings of the invention, can be applied to the main or basic types of product specified in the introduction, i.e. biscuit or support slabs, fine porcellainized stone slabs, and pressure-glazed slabs.

In a totally general sense, to attain said object and in accordance with the proposed method, the final compacting of the large-dimension ceramic slab or tile is done in the total absence of lateral or peripheral retention action thereon.

All the objects of the invention are attained by the aforesaid method.

In this respect, said absence of lateral retention eliminates all problems associated with perfect centering of the blank being transferred from the first to the second pressing unit, and with the deaeration of the blank during final compacting, by which means the process is considerably accelerated and simplified.

Specifically, the second pressing unit of the invention essentially comprises a system of anvil and hammer type, described in detail hereinafter, which gives the overall plant the required characteristics of simplicity, low cost, low weight, reliability with time, a production rate of the same order of magnitude as that required for forming tiles of average format, and virtually total absence of rejects.

The characteristics and constructional merits of the invention will be apparent from the ensuing detailed description, given with reference to the figures of the accompanying drawings, which illustrate by way of non-limiting example three preferred embodiments of a plant for implementing the method of the invention.

It is stated precisely that in the following description the wording "powder" comprises:

- dry powders (having a moisture degree less than 2%), for instance re-granulated and/or atomized glazes, or finely minced ceramic frits,
- semi-dry powders (having a moisture degree between 2% and 6%), for example atomized or milled or micronized (finely grinded) ceramic mixes,
- agglomerated materials, as flakes of ceramic mixtures, flakes of ceramic frits o glazes, and granules (obtained by wet or dry way), and
- wet pastes (having a moisture degree more than 20%) of ceramic mixes (slips), or wet ceramic glazes, or silk screen printing pastes.

Figure 1:
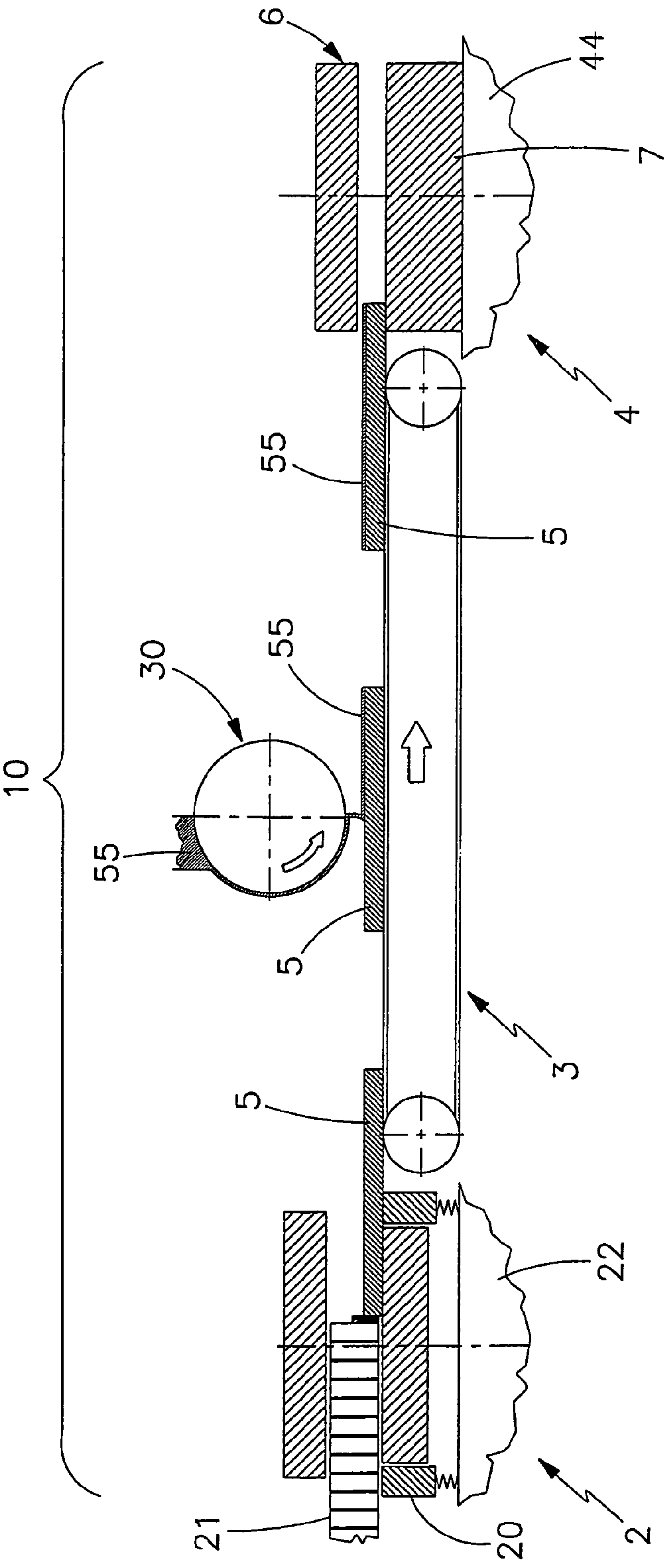
FIG. 1 is a schematic side sectional view showing a plant according to the invention.

From said figures, and in particular FIG. 1, it can be seen that the plant, indicated overall by the reference numeral 10, comprises, from upstream to downstream, a first pressing unit 2, a horizontal conveyor with an overlying decorating unit 30, and a second pressing unit 4.

The first pressing unit 2 comprises a mould of traditional type, as described in the introduction, positioned on a ceramic press 22.

The mould shown is of the type comprising a movable die plate 20, but there is nothing to prevent a fixed die plate mould from being used.

A loading device for the soft starting material is associated with said mould, this mass consisting of at least one substantially dry material in powder form, well know to the expert of the art.

The loading device is of usual type, and comprises a slider 21 with a grid and front pusher, the slider 21 being arranged to slide with reciprocating horizontal movement in synchronism with the forming cycle of the press 22.

The upper generators of the outward portion of the conveyor 3 are in line with the upper face of the die plate 20 when in its raised position, said outward portion being suitably supported lowerly in view of the weight of the blank 5 arriving from the first pressing unit 2.

The conveyor 3 can be of any type suitable for the purpose, for example of V-belt, strap, solid or perforated band, or mesh type.

The decorating unit 30 is also of usual type, and is able to deliver at least one substantially dry finishing material 55, such as a ceramic glaze in powder or flake form.

The decorating unit 30 is activated when forming pressure-glazed ceramic tiles, and deactivated when forming biscuit or fine porcellainized stone tiles.

Figure 2:
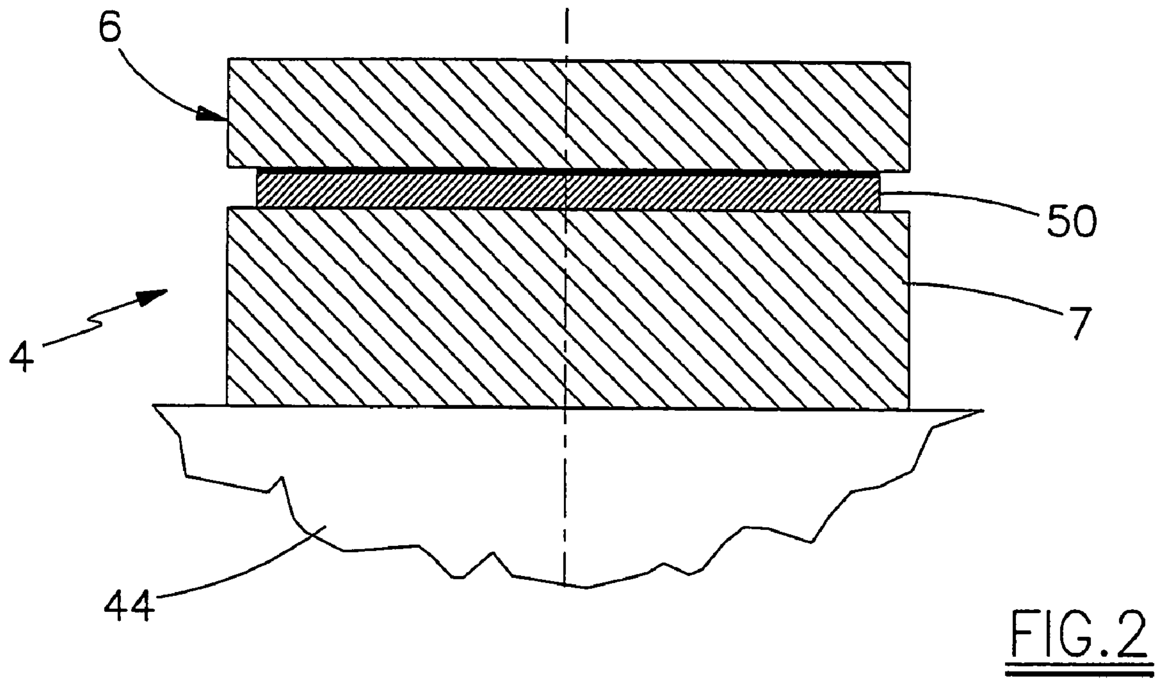
FIG. 2 is a partial view of FIG. 1 showing the second pressing unit on termination of the compacting of a large-dimension ceramic slab.
Figure 3:
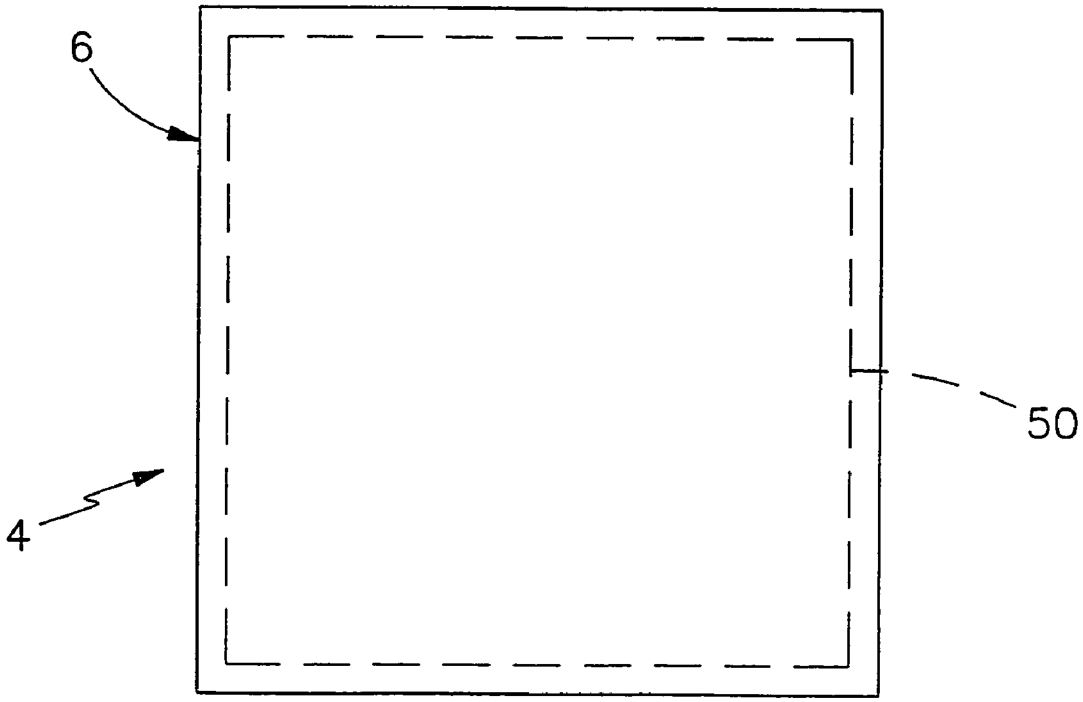
FIG. 3 is a view of FIG. 2 from above.

In the embodiment shown in FIGS. 1 to 3, the second pressing unit comprises two mutually movable overlying dies, the mutually facing active faces of which are horizontal; and perfectly flat.

The lower die 7, also called the anvil, is fixed to the bed of a ceramic press 44, and has its active upper face in line with the upper generators of the conveyor 3.

The upper die 6, also called the hammer, is carried by the vertically movable crosspiece of said press 44.

Said anvil 7 and said hammer 6 have the same plan shape, which is greater than that of the blank 5.

For pressure-glazing production, the described plant operates as follows.

The mould of the first pressing unit 2 is loaded in the usual manner with a soft mass of (at least one) powder material, after which said mass is compacted.

According to the invention, a relatively low specific pressure is applied to said mass, sufficient to deaerate the powder and to shape the mass as a consistent blank 5 able to be then extracted from the mould and transferred downstream without the danger of breakage.

Tests have shown that a specific pressure between 50 and 150 bar is suitable, to be chosen on the basis of the powder material to be processed and its moisture content, this latter being usually between 1 and 11% depending on the type of starting material.

As already stated, even substantial deviations in moisture content from the typical value for the work under way do not create any problems.

This is because after application of the finishing material 55, the blank 5 is simply placed between the anvil 7 and hammer 6, such positioning obviously requiring no particular accuracy, even if relatively large dimensional variations are present in the blank 5, and is also very rapid.

What is important is that the plan contour of the blank 5 is contained within that of said anvil 7 and hammer 6 (see FIGS. 2 and 3).

This having been done, the hammer 6 is lowered to compress the blank 5 with a specific pressure between 250 and 600 bar depending on the material being processed, to obtain a large-dimension ceramic slab or tile virtually completely compacted and virtually completely deaerated.

The time required to achieve this final result is relatively short as there are no retention elements positioned about the slab 50, and is of the same order of magnitude as the time required to obtain substantially the same results when pressing a tile of average dimensions within a mould of traditional type.

Said operating time is also very low because the stroke of the hammer 7 is very short, as shown in FIG. 1, i.e. of the order of magnitude of the thickness of the blank plus the decoration.

In contrast, in the known art the time required for the final compaction and deaeration are relatively much longer because of the presence of the die plate, because of the necessarily longer stroke of the upper die, and because of the presence of more mutually moving parts, the coordinated movements of which inevitably consume unproductive time, for example.

The same considerations also apply to biscuit or fine porcellainized stone processing.

The aforesaid operations are in continuous succession, with the pressing unit 2 preparing a blank 5 while the pressing unit 4 compacts a slab 50 which may have been previously surface-finished by the decorating unit 30.

In view of the dimensions of the slabs 50, for example 1×1 m, and the specific pressures in play, the upper die or hammer 6 may, in contrast to the lower die or anvil 7 which rests on the bed of the press 44, assume a slight central dishing, with the result that the perimetral edge of the slab 50 may be slightly irregular or relatively little compacted.

This can be remedied by a subsequent finishing operation on the crude or even partially dried slab 50, for example by the means described in patent application RE99A000061 in the name of the same Applicant.

Alternatively, a second pressing unit 4 in accordance with the variants of FIGS. 4 to 7 can be used.

Figure 4:
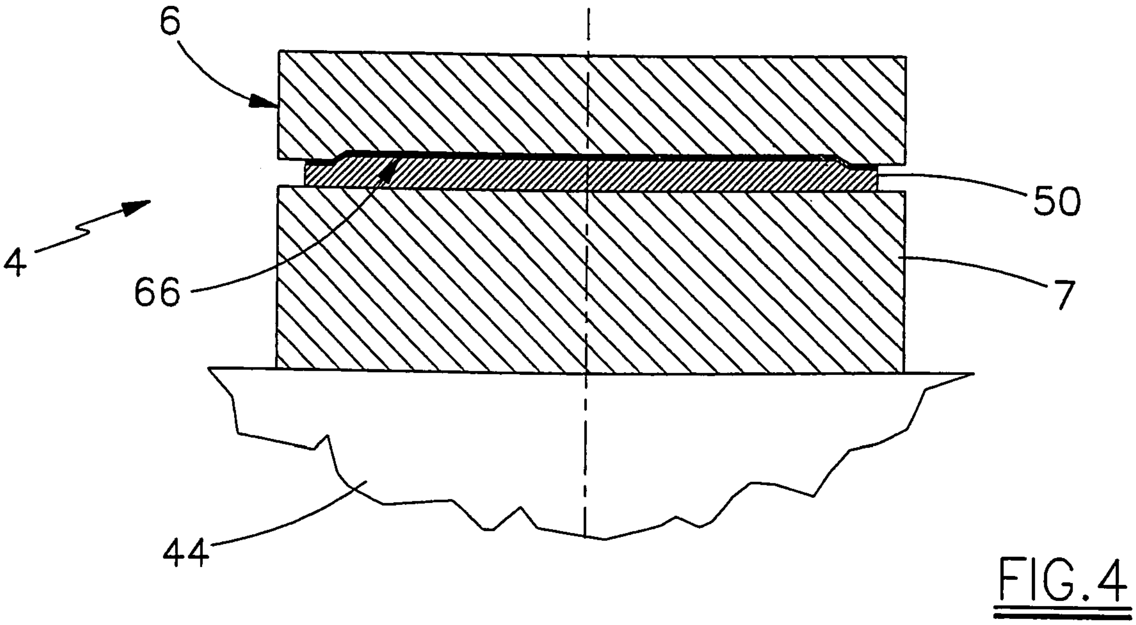
FIG. 4 is a view similar to FIG. 2, but showing a first variant of the second pressing unit.
Figure 5:
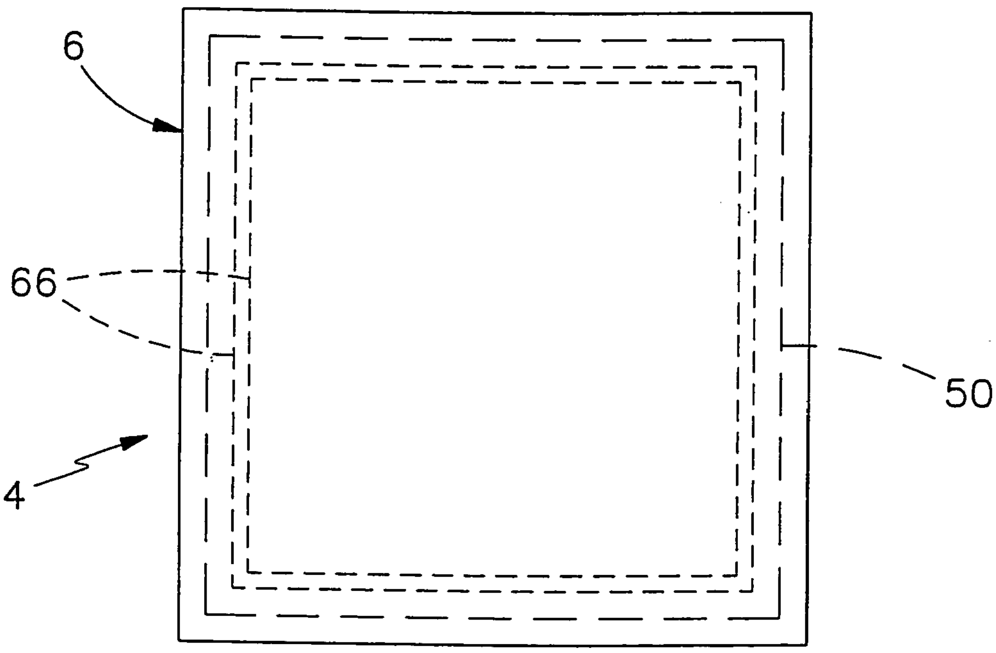
FIG. 5 is a view of FIG. 4 from above.

In the variant shown in FIGS. 4 and 5, the active face of the hammer 6 is provided centrally with a small concentric depression 66 which is connected to the perimetral band of said active face by a totally extending slightly inclined bevel.

By this means, at the commencement of pressing, the perimetral edge of the blank 5 is contacted slightly earlier than the remainder, said possible small deformations of the hammer 6 being taken up on termination of pressing.

Figure 6:
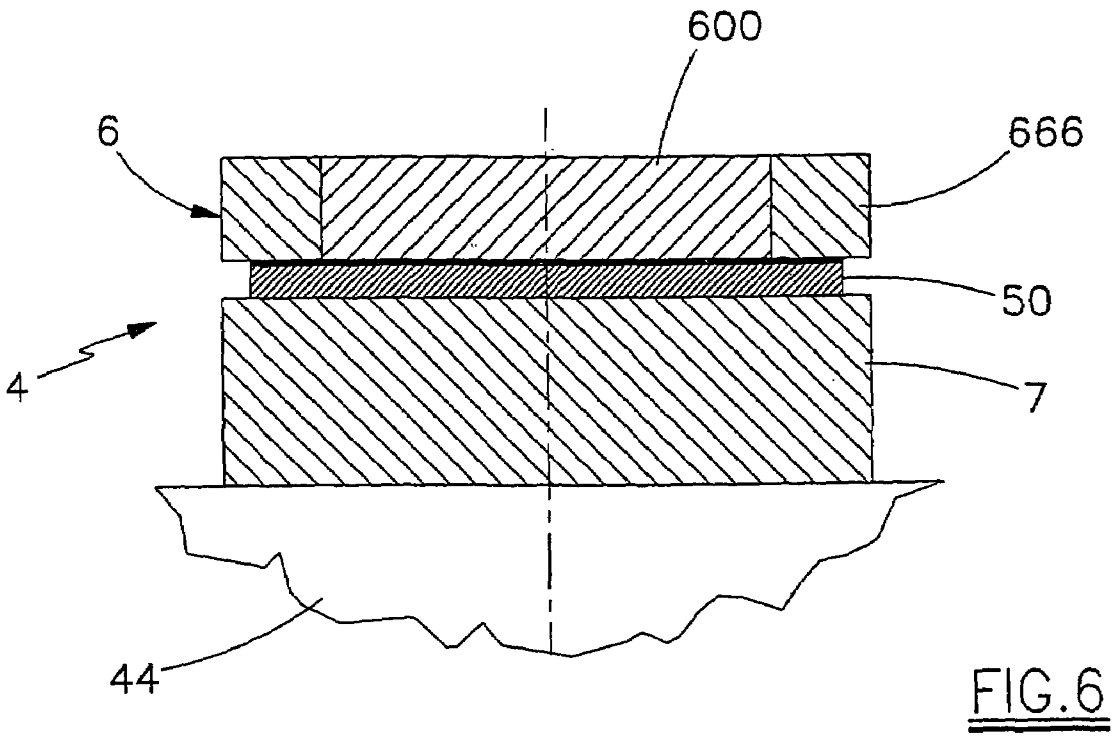
FIG. 6 is a view similar to FIG. 2, but showing a further variant of the second pressing unit.
Figure 7:
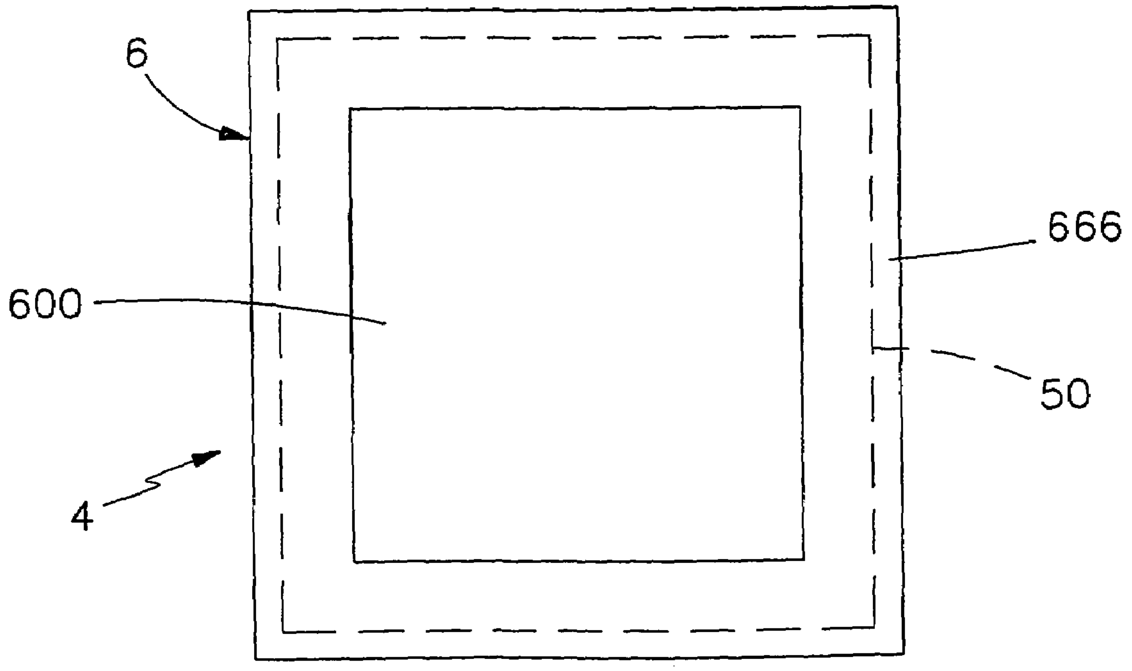
FIG. 7 is a view of FIG. 6 from above.

In the variant of FIGS. 6 and 7, the upper die or hammer 6 comprises a central part 600 and a frame-shaped surrounding part 666, the active faces of which are flat.

Said two parts 600 and 666 fit precisely together and are connected to the crosspiece of the press 44 by independent operating means as described in the two patent applications RE97A00058 and RE97A00057 in the name of the same Applicant.

During pressing, the frame-shaped part 666 is lowered slightly earlier than the central part 600.

It should be noted that the blank 5 can be shaped by means other than those shown, for example by belt presses and roller devices.

Any number of decorating units, of the same or different type, can be associated with the conveyor 3.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An apparatus for forming large dimension ceramic tiles, comprising a first pressing or deaeration unit for pressing ceramic particles into a blank and having a die plate providing a mold cavity and first and second pressing faces having given dimensions, said pressing faces being operative in cooperation with said die plate for forming the blank so that the blank has the given dimensions, a second pressing or compacting unit for compacting the blank received from said first pressing or deaeration unit, said second pressing or compacting unit being downstream from said first pressing or deaeration unit, and a conveying system between said first pressing or deaeration unit and said second pressing or compacting unit for conveying blanks from said first pressing or deaeration unit to said second pressing or compacting unit, said second pressing or compacting unit comprising a fixed lower die having a face level with said conveying system, and a moveable die located above said fixed die, said moveable die being moveable between a raised position in which said moveable die awaits arrival of a blank from said conveying system, and a lowered position in which it compacts the blank, and said fixed die and said moveable die having active faces with dimensions larger than the given dimensions of said first and second pressing faces.

2. An apparatus according to claim 1 wherein at least one decorating unit for surface-finishing the blank formed by said first pressing unit is positioned between said first and said second pressing units.

3. An apparatus according to claim 1 wherein said active face of said fixed die is flat, whereas said movable die comprises at least two mutually movable parts, namely a central part and a frame-shaped outer part, said at least two parts having flat active faces and being connected to respective actuator means.

4. An apparatus according to claim 1 wherein said active faces are flat and mutually parallel.

5. An apparatus according to claim 1 wherein said active face of said fixed die is flat, whereas said active face of said movable die is provided centrally with a slight concentric depression which is connected to a marginal band of said active face by a totally extending bevel with slight inclination.

* * * * *